(12) United States Patent
Uchida et al.

(10) Patent No.: US 12,351,723 B2
(45) Date of Patent: Jul. 8, 2025

(54) RECORDING METHOD AND RECORDING APPARATUS

(71) Applicant: SEIKO EPSON CORPORATION, Tokyo (JP)

(72) Inventors: Kenta Uchida, Matsumoto (JP); Yusuke Mizutaki, Shiojiri (JP); Miki Uchida, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 161 days.

(21) Appl. No.: 18/183,433

(22) Filed: Mar. 14, 2023

(65) Prior Publication Data
US 2023/0295451 A1 Sep. 21, 2023

(30) Foreign Application Priority Data
Mar. 15, 2022 (JP) .................. 2022-040487

(51) Int. Cl.
B41J 2/175 (2006.01)
B41J 2/14 (2006.01)
B41J 2/16 (2006.01)
B41M 5/00 (2006.01)
C09D 11/322 (2014.01)
C09D 11/38 (2014.01)

(52) U.S. Cl.
CPC ................. C09D 11/38 (2013.01); B41J 2/14 (2013.01); B41J 2/1606 (2013.01); B41J 2/175 (2013.01); B41M 5/0047 (2013.01); C09D 11/322 (2013.01)

(58) Field of Classification Search
None
See application file for complete search history.

(56) References Cited

U.S. PATENT DOCUMENTS

| 2016/0355019 | A1* | 12/2016 | Negishi | B41J 2/195 |
| 2016/0355020 | A1 | 12/2016 | Yamamoto et al. | |
| 2020/0398580 | A1* | 12/2020 | Anno | B41J 29/38 |
| 2021/0198507 | A1* | 7/2021 | Kumeta | B41J 2/14 |
| 2022/0184970 | A1* | 6/2022 | Kusada | B41J 2/1753 |

FOREIGN PATENT DOCUMENTS

| JP | 2017-001392 A | 1/2017 | |
| JP | 2020044724 A | * 3/2020 | ............ B41J 2/2107 |

OTHER PUBLICATIONS

Okuda, Machine Translation of JP-2020044724-A, 2020 (Year: 2020).*

* cited by examiner

Primary Examiner — Scott A Richmond
(74) Attorney, Agent, or Firm — Harness, Dickey & Pierce, P.L.C.

(57) ABSTRACT

A recording method includes a supply step of supplying an ink composition from an ink chamber to an ink jet head and an adhesion step of discharging the ink composition from the ink jet head and allowing the composition to adhere to a recording medium. The ink chamber receives supply of the ink composition from the ink container and has a capacity of 40 mL or more. The ink composition is an aqueous ink composition containing a pigment and an inorganic oxide particle having a specific gravity equal to or higher than that of the pigment.

15 Claims, 1 Drawing Sheet

RECORDING METHOD AND RECORDING APPARATUS

The present application is based on, and claims priority from JP Application Serial Number 2022-040487, filed Mar. 15, 2022, the disclosure of which is hereby incorporated by reference herein in its entirety.

BACKGROUND

1. Technical Field

The present disclosure relates to a recording method and a recording apparatus.

2. Related Art

An ink jet recording method can record high-definition images with a relatively simple apparatus, and has made rapid progress in each field. Especially, various investigations have been made about discharge stability and the like. For example, Japanese Unexamined Patent Application Publication No. 2017-001392 discloses a recording method using an ink composition including a prescribed water-soluble organic solvent and discharging the ink with a predetermined viscosity by increasing the temperature of the ink for the purpose of improving the intermittent discharge stability when a recording apparatus having a main tank and a sub tank is used for a long time.

SUMMARY

It is conceivable to provide an ink chamber between an ink container and an ink jet head of a recording apparatus so that printing will not suddenly stop even if the ink in the ink container runs out. However, in such an ink chamber, a pigment or the like in the accommodated ink composition precipitates, and such precipitation of the pigment may influence the image quality of recorded matters.

The recording method of the present disclosure comprises a supply step of supplying an ink composition from an ink chamber to an ink jet head and an adhesion step of discharging the ink composition from the ink jet head and allowing the composition to adhere to a recording medium, wherein the ink chamber receives supply of the ink composition from an ink container and has a capacity of 40 mL or more, and the ink composition is an aqueous ink composition containing a pigment and an inorganic oxide particle having a specific gravity higher than that of the pigment.

In addition, the recording apparatus of the present disclosure comprises an ink chamber and an ink jet head to which an ink composition is supplied from the ink chamber, wherein the ink chamber receives supply of the ink composition from an ink container, and the ink chamber has a capacity of 40 mL or more, and the ink composition is an aqueous ink composition containing a pigment and an inorganic oxide particle having a specific gravity higher than that of the pigment.

DESCRIPTION OF EXEMPLARY EMBODIMENTS

Figure 1:
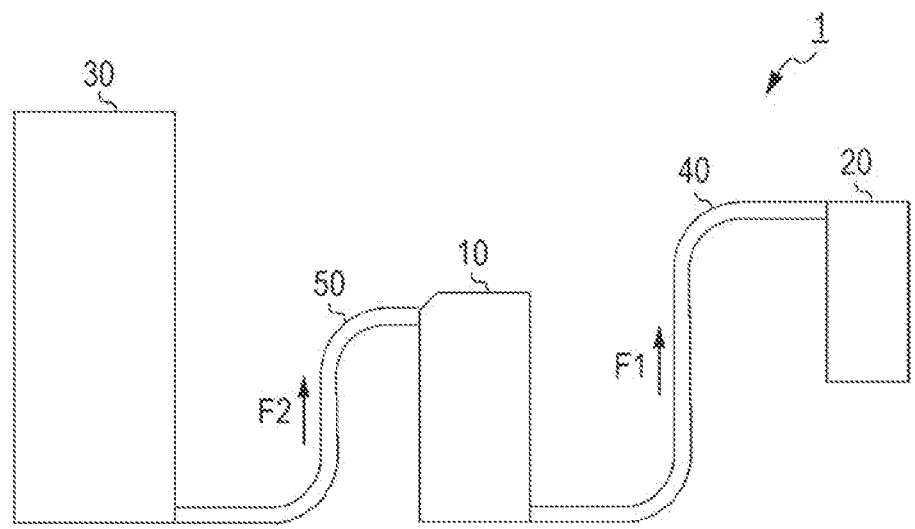
FIG. 1 is a schematic diagram showing an ink chamber and so on of a recording apparatus that is used in the recording method of the present embodiment.

Embodiments of the present disclosure (hereinafter, referred to as the present embodiment) will now be described in detail while referring to a drawing as needed, but the present disclosure is not limited thereto and can be variously modified without departing from the gist. Incidentally, in the drawings, the same elements are denoted by the same reference signs, and overlapping descriptions are omitted. Positional relationships, such as top, bottom, left, and right, are based on the positional relationships shown in the drawings unless otherwise specified. The dimensional ratios of the drawings are not limited to those shown in the drawings.

1. Recording Method

The recording method of the present embodiment comprises a supply step of supplying an ink composition from an ink chamber to an ink jet head and an adhesion step of discharging the ink composition from the ink jet head and allowing the composition to adhere to a recording medium, wherein the ink chamber receives supply of the ink composition from an ink container and has a capacity of 40 mL or more, and the ink composition is an aqueous ink composition containing a pigment and an inorganic oxide particle having a specific gravity higher than that of the pigment.

It is conceivable to provide an ink chamber between an ink container and an ink jet head in a recording apparatus so that printing will not suddenly stop even if the ink in the ink container runs out.

In particular, it is useful to provide such an ink chamber to a recording apparatus that often prints in large quantities, such as a line printer.

When a pigment having excellent color development is used, in particular, precipitation of the pigment occurs to influence the image quality of a recorded matter.

However, it has been revealed that in such an ink chamber, the pigment or the like in the accommodated ink composition precipitates while the recording apparatus is stopped to cause concentration unevenness and uneven color difference in the recorded matters before and after stopping the recording apparatus.

It is suggested to shake the ink chamber by a hand or the like from the viewpoint of eliminating the precipitation. However, in many cases, the ink chamber is fixed between the ink container and the ink jet head of a recording apparatus, and it is difficult to shake only the ink chamber for stirring the precipitate. In addition, it is suggested to suppress the precipitation of a pigment or the like by providing a stirring mechanism or circulation mechanism to the ink chamber. However, the apparatus configuration is complicated by providing such a mechanism, and the cost is also increased.

In contrast, in the present embodiment, the recording method using a recording apparatus including an ink chamber suppresses precipitation of a pigment by using an ink composition containing an inorganic oxide particle having a specific gravity higher than that of the pigment, and thereby concentration unevenness and uneven color difference can be suppressed. Although the reason of this is not specifically limited, it is inferred that the inorganic oxide particle precipitates earlier than the pigment, and the precipitation of the pigment is suppressed by electrostatic repulsion and so on of the precipitated inorganic oxide particle and so on.

The structure of the recording method of the present embodiment will now be described in detail.

1.1. Supply Step

The supply step is a step of supplying an ink composition from an ink chamber to an ink jet head. FIG. 1 shows a schematic diagram of a recording apparatus including an ink chamber as a sub-tank. As shown in FIG. 1, the recording apparatus 1 that implements the recording method of the present embodiment includes an ink chamber 10, an ink jet head 20, and a first ink channel 40. The ink composition accommodated in the ink chamber 10 is supplied to the ink jet head 20 through the first ink channel 40.

1.1.1. Ink Chamber

The ink chamber 10 receives supply of the ink composition from an ink container 30. The ink chamber 10 of the present embodiment is not specifically limited and may be, for example, a sub-tank or an ink storage chamber provided to a continuous ink supply system (CISS).

The capacity of the ink chamber 10 is 40 mL or more and may be 50 to 500 mL, 60 to 400 mL, or 60 to 300 mL. When the ink chamber 10 has a capacity of 40 mL or more, since a pigment is likely to precipitate, the present disclosure is particularly useful.

The material of the ink chamber is not limited, and a metal, glass, a resin, or the like that can accommodate an ink composition can be used.

1.1.1.1. Sub-Tank

The ink chamber 10 as a sub-tank receives supply of the ink composition from the ink container 30 as a main tank and supplies the supplied ink composition to the ink jet head 20 through the first ink channel 40. Here, the ink container 30 is not particularly limited, and examples thereof include containers accommodating ink compositions, such as an ink cartridge and an ink pack. The volume of the ink in the ink container 30 is not limited and may be, for example, 100 to 3000 mL.

The supply of the ink composition to the ink chamber 10 as the sub-tank may be automatically performed by control of the recording apparatus as the ink composition is consumed. Alternatively, the supply of the ink composition to the ink chamber 10 as the sub-tank and the supply of the ink from the ink chamber 10 as the sub-tank to the ink jet head 20 may be simultaneously performed by control of the recording apparatus. In this case, the recording method of the present embodiment may further include a step of supplying the ink composition from the ink container 30 to the ink chamber 10.

The location for installing the ink chamber 10 as the sub-tank is not specifically limited as long as it is between the ink jet head 20 and the ink container 30, and the ink chamber 10 may be disposed, for example, in the ink jet head 20. Alternatively, the ink composition may be supplied from the vertical top of the ink chamber 10. The ink composition in the ink chamber 10 is stirred by supplying the ink composition from above, and the precipitation of the pigment tends to be eliminated. Alternatively, the ink composition may be supplied to the ink jet head 20 from the vertical bottom of the ink chamber 10. Consequently, air bubbles tend to be less likely to enter the ink composition that is supplied to the ink jet head 20.

1.1.1.2. Continuous Ink Supply System

The "continuous ink supply system" refers to a form of implementing recording by replenishing the ink chamber provided to a recording apparatus with an ink composition and using the ink composition replenished in the ink chamber. For example, the ink chamber 10 in a continuous ink supply system has an ink pour and receives supply of the ink composition from the ink container 30 and supplies the supplied ink composition to an ink jet head 20 through a first ink channel 40. Here, the ink container 30 is not particularly limited, and examples thereof include an ink bottle that is connected to the ink chamber 10 only when the ink composition is supplied to the ink chamber 10. The connection is not limited to connection through a member for the connection and may be connection for directly supplying the ink composition from the ink bottle to the ink pour without passing through a member for connection.

In the continuous ink supply system, the ink composition may be manually supplied from the ink pour to the ink chamber 10. The supply of the ink from the ink chamber 10 to the ink jet head 20 in the continuous ink supply system may be automatically performed by control of the recording apparatus as the ink composition is consumed. Incidentally, since the continuous ink supply system implements recording using an ink composition replenished in the ink chamber, the supply of the ink composition to the ink chamber 10 in the continuous ink supply system and the supply of the ink from the ink chamber 10 to the ink jet head 20 in the continuous ink supply system need not to be simultaneously performed.

1.1.2. Ink Jet Head

The ink jet head 20 is not particularly limited, and examples thereof include a line head which performs recording by a line system and a serial head which performs recording by a serial system.

In a line system using a line head, for example, a liquid jet head having a width equal to or larger than the recording width of a recording medium is fixed to an ink jet apparatus. A recording medium is moved along the scanning direction (the longitudinal direction of the recording medium, the transport direction), and in conjunction with this movement, an operation of discharging ink droplets from the nozzles of the liquid jet head is performed to record an image on the recording medium.

Alternatively, the recording medium is fixed to the recording apparatus. An ink jet head having a width equal to or larger than the recording width of the recording medium is moved along the scanning direction, and in conjunction with this movement, an operation of discharging ink droplets from the nozzles of the ink jet head is performed to record an image on the recording medium. The scanning direction is the direction of operation.

Figure 2:
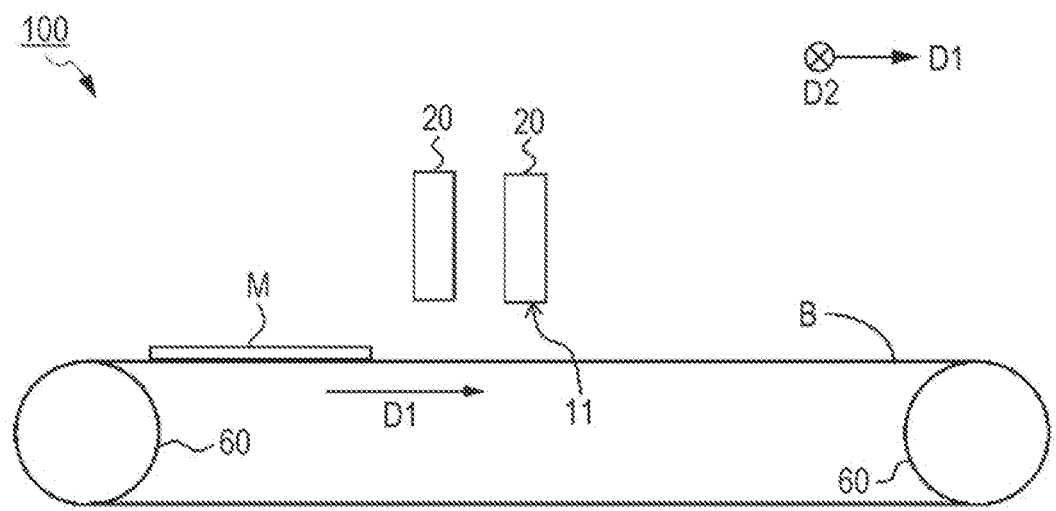
FIG. 2 is a schematic cross-sectional view of a recording apparatus that can be used in the recording method of the present embodiment.

FIG. 2 shows a schematic cross-sectional view of a recording apparatus that can be used in the recording method of the present disclosure. The ink jet head 20 is a line head, has a length equal to or longer than the recording width of a recording medium, and is a means of discharging an ink composition to allow it to adhere onto a recording medium M. The ink jet head 20 includes nozzle rows (not shown) aligned in the direction D2 of the recording width of a recording medium on a nozzle face 11 facing the recording medium M. The recording medium M is supported by a belt B and is transported in a transport direction D1. The number of the ink jet head 20 is not limited to two and may be one or more. The belt B is moved in the transport direction D1 by belt rollers 60. FIG. 1 does not show the above-described ink chamber and so on. The recording apparatus may include a paper feed tray, a paper output tray, and so on (not shown in the drawing).

In a serial system using a serial head, for example, a liquid jet head is mounted on a carriage movable in the width direction of the recording medium. The carriage is moved along the main scanning direction (the width direction of the recording medium, the width direction), and in conjunction with this movement, ink droplets are discharged from the nozzle orifices of the head to record an image on the recording medium.

In particular, recording may be performed by a line system recording method using an ink jet head having a width equal to or larger than the recording width of a recording medium. A line system recording method is suitable for high-speed printing and large quantity printing, and out of ink is likely to occur. It is therefore beneficial to provide an ink chamber. Accordingly, the present disclosure that eliminates the precipitation of a pigment in an ink chamber and a color difference by precipitation is particularly useful.

1.1.3. Ink Channel

The ink channel is a channel for distributing an ink in the recording apparatus. Examples of the ink channel include a first ink supply path 40 for supplying an ink composition from the ink chamber 10 storing the ink composition to the ink jet head 20, a second ink supply path 50 for supplying an ink composition from the ink container 30 to the ink chamber 10, and a channel for distributing an ink composition to the nozzle orifice portion in the ink jet head 20.

The length of the first ink supply path 40 from the ink chamber 10 to the ink jet head 20 may be 100 mm or more and 1500 mm or less and may be 200 to 1500 mm, 300 to 1000 mm, or 400 to 750 mm. When the length of the first ink supply path 40 is within the above range, during the process of the ink composition passing through the first ink supply path 40, the precipitated pigment tends to be easily stirred again. The distance until the ink jet head 20 means the distance until the nozzle of the ink jet head 20.

1.2. Adhesion Step

The adhesion step is a step of discharging an ink composition from an ink jet head and allowing the composition to adhere to a recording medium.

Examples of the system for discharging an ink composition from a nozzle in the ink jet head include a method for discharging a composition loaded in a pressure-generating chamber of an ink jet head from a nozzle by driving a pressure-generating means and a method for discharging by applying thermal energy. These discharging methods are also referred to as ink jet methods. The method of applying a pressure to the ink composition in a nozzle is not particularly limited, and examples thereof include a piezoelectric system in which liquid droplets of an ink composition are discharged with a piezoelectric element and a thermal system in which liquid droplets are discharged by heating.

1.3. Ink Composition

The ink composition is an aqueous ink composition containing a pigment and an inorganic oxide particle having a specific gravity higher than that of the pigment. The ink composition may further contain, in addition to the above components, water, a water-soluble organic solvent, a lactam compound, a resin emulsion, a surfactant, a pH adjuster, and so on as needed.

1.3.1. Pigment

The pigment is not particularly limited. For example, organic pigments, such as azo pigments (including, e.g., azo lake, an insoluble azo pigment, a condensed azo pigment, and a chelate azo pigment), polycyclic pigments (e.g., a phthalocyanine pigment, a perylene pigment, a perinone pigment, an anthraquinone pigment, a quinacridone pigment, a dioxazine pigment, a thioindigo pigment, an isoindolinone pigment, and a quinophthalone pigment), nitro pigments, nitroso pigments, and aniline black; inorganic pigments, such as carbon black (e.g., furnace black, thermal lamp black, acetylene black, and channel black), metal oxides, metal sulfides, and metal chlorides; and extender pigments, such as calcium carbonate and talc, can be used. The pigments may be used alone or in combination of two or more.

In particular, the pigment may include either carbon black or an organic pigment. Consequently, the specific gravity tends to decrease, and the precipitation of the pigment is further suppressed.

The specific gravity of the pigment may be 0.1 to 2.0, 0.1 to 1.9, 0.2 to 1.8, or 0.3 to 1.7. When a pigment has a specific gravity within the above range, the precipitation of the pigment tends to be further suppressed.

The pigment can be used as a pigment dispersion obtained by dispersing the pigment in water with a dispersant. For example, a pigment dispersion using a dispersant resin as the dispersant (hereinafter, also referred to as "resin dispersion pigment") is mentioned.

Alternatively, a dispersion obtained by dispersing, in water, a self-dispersion type surface-treated pigment having a hydrophilic group introduced to the pigment particle surface by a chemical reaction (hereinafter, also referred to as "self-dispersing pigment") is mentioned.

Furthermore, a dispersion obtained by dispersing, in water, a pigment coated with a polymer is also mentioned.

In particular, a self-dispersing pigment may be contained in the ink. The use of a self-dispersing pigment tents to further improve the water repellency of the nozzle plate and intermittent printing stability.

The pigments and dispersants constituting the pigment dispersion may be each used alone or in combination of two or more.

The volume average particle diameter of the pigment may be 20 to 250 nm, 40 to 230 nm, 60 to 210 nm, or 80 to 190 nm and further may be 100 to 180 nm.

When the volume average particle diameter of the pigment is 20 nm or more, the color development tends to be further improved. When the volume average particle diameter of the pigment is 250 nm or less, the precipitation of the pigment tends to be further suppressed.

The content of the pigment may be 0.5 mass % or more as solid content with respect to the total mass of the ink composition and may be 1.0 to 10 mass %, 3.0 to 10 mass %, or 4.0 to 8.0 mass %. When the content of the pigment is within the above range, the precipitation is suppressed, and the color development tends to be further improved.

1.3.2. Inorganic Oxide Particle

The inorganic oxide particle is not particularly limited as long as it has a specific gravity higher than that of the pigment. The inorganic oxide particle can suppress the precipitation of the pigment. In addition, the penetration of the ink to the recording medium can be suppressed, and the color development of the recorded matter is excellent.

The specific gravity of the inorganic oxide particle may be 2.0 to 6.0, 2.0 to 5.0, or 2.0 to 4.0. When the true specific gravity of the inorganic oxide particle is within the above range, the precipitation of the pigment tends to be further suppressed.

The specific gravity of the inorganic oxide particle may be higher than the specific gravity of the pigment by 0.1 or more and by 0.2 to 3.0, 0.3 to 2.0, or 0.3 to 1.0.

The inorganic oxide particle is not particularly limited, and examples thereof include silica, alumina, zirconia, titania, ceria, antimony oxide, tin oxide, tantalum oxide, zinc oxide, lead oxide, and indium oxide. In particular, at least one selected from the group consisting of silica, alumina, zirconia, titania, and ceria may be contained in the ink. The use of such an inorganic oxide particle further suppresses curling of the obtained recorded matter and further improves stacking performance. Incidentally, the inorganic oxide particle may be a single type or a combination of two or more types. The inorganic oxide particle may be a particle at least containing an inorganic oxide therein and can be a particle consisting of an inorganic oxide.

The inorganic oxide particle may be a surface-treated particle. For example, silica may be surface-treated with alumina. Consequently, the range of pH allowing silica to be stably dispersed is widened, and the dispersion stability tends to be further improved.

As the silica described above, a commercial product can also be used, and examples thereof include CATALOID series SI-45P, SI-80, SI-30P, and S-40 manufactured by JGC Catalysts and Chemicals Ltd. and SNOWTEX 20, SNOWTEX 30P, SNOWTEX 40, SNOWTEX O, SNOWTEX N, and SNOWTEX C manufactured by Nissan Chemical Corporation. Among the above-mentioned silica, from the viewpoint of further effectively and certainly causing the effects of the present disclosure, SI-45P and/or SI-80 may be used.

The volume average particle diameter of the inorganic oxide particle may be 100 nm or less and 5 nm or more and may be 10 to 95 nm, 20 to 90 nm, or 40 to 80 nm. When the average particle diameter of the inorganic oxide particle is 100 nm or less, the obtained recorded matter is prevented from whitening, and also the precipitation of the pigment tends to be further suppressed. When the average particle diameter of the inorganic oxide particle is within the above range, the color development tends to be further improved.

The average particle diameter of an inorganic oxide particle can be measured with a particle size distribution analyzer using dynamic light scattering as the measurement principle. Examples of the particle size distribution analyzer include "Zeta-potential & Particle size Analyzer ELSZ-2000ZS" (trade name) manufactured by Otsuka Electronics Co., Ltd. adopting a homodyne optical system as the frequency analysis method. Incidentally, in the present specification, the term "average particle diameter" indicates number-based average particle diameter (D50) unless otherwise specified.

The content of the inorganic oxide particle may be 0.5 to 8.0 mass %, 1.0 to 6.0 mass %, or 1.5 to 4.5 mass % as solid content with respect to the total mass of the ink composition. When the content of the inorganic oxide particle is within the above range, precipitation is further suppressed, and color development tends to be further improved.

1.3.3. Water

The ink composition of the present embodiment is an aqueous ink. The aqueous ink is an ink containing water as a main solvent component. The content of water in the aqueous ink may be 40 mass % or more or 40 to 98 mass % with respect to the total mass of the ink composition and further may be 45 mass % or more and 80 mass % or less, 50 mass % or more and 75 mass % or less, or 55 mass % or more and 70 mass % or less.

1.3.4. Water-Soluble Organic Solvent

The ink composition of the present embodiment may contain a water-soluble organic solvent. When the ink composition contains a water-soluble organic solvent, the shelf life tends to be further improved.

The water-soluble organic solvent is not particularly limited, and examples thereof include triol or higher polyols, such as glycerin; nitrogen-containing solvents, such as 2-pyrrolidone and N-methylpyrrolidone; glycols, such as ethylene glycol, diethylene glycol, triethylene glycol, propylene glycol, dipropylene glycol, tripropylene glycol, propane diol, butane diol, pentane diol, and 1,2-hexane diol; and glycol monoalkyl ethers, such as ethylene glycol monomethyl ether, diethylene glycol monomethyl ether, diethylene glycol monoethyl ether, diethylene glycol monobutyl ether, triethylene glycol monomethyl ether, and triethylene glycol monobutyl ether.

The content of the water-soluble organic solvent may be 5.0 to 25 mass %, 7.5 to 20 mass %, or 10 to 15 mass % with respect to the total mass of the ink composition. When the content of the water-soluble organic solvent is within the above range, the precipitation of the pigment is further suppressed, and the printing continuity tends to be further improved.

1.3.5. Lactam Compound

The ink composition of the present embodiment may contain a lactam compound. When the lactam compound is contained, even if the inorganic oxide particles aggregate, the resolubility thereof is further improved, and the printing continuity tends to be further improved.

The lactam compound may be a water-soluble compound. Among lactam compounds, a water-soluble compound that is a liquid at ordinary temperature is also the above-described water-soluble organic solvent.

The lactam compound is a 3- or more-membered ring and may be a 3- to 9-membered ring or a 5- to 8-membered ring.

The lactam compound is not particularly limited, and examples thereof include 2-pyrrolidone, N-methyl-2-pyrrolidone, 1-(2-hydroxyethyl)-2-pyrrolidone, 3-methoxy-2-pyrrolidone, 3-acetoxy-2-pyrrolidone, 4-pentane lactam, and ε-caprolactam.

The content of the lactam compound may be 1.0 to 10 mass %, 1.5 to 8.0 mass %, or 2.0 to 6.0 mass % with respect to the total mass of the ink composition. When the content of the lactam compound is within the above range, the printing continuity tends to be further improved.

1.3.6. Resin Emulsion

A resin emulsion may be further contained. The resin emulsion is not particularly limited, and examples thereof include a (meth)acrylic resin emulsion and a urethane resin emulsion. The use of such a resin emulsion further suppresses bleeding of the resulting image and tends to further improve the abrasion resistance. The resin emulsion may be used as a single type or a combination of two or more types.

The acrylic resin emulsion is not particularly limited, and examples thereof include a polymer of a (meth)acrylic monomer such as (meth)acrylic acid and (meth)acrylic acid ester and a copolymer of a (meth)acrylic monomer and another monomer, such as a styrene-acrylic resin. In particular, an anionic acrylic resin microparticle may be used.

The urethane resin emulsion is not particularly limited as long as the resin of the emulsion has a urethane bond in the molecule, and examples thereof include a polyether urethane resin having an ether bond in the main chain, a polyester urethane resin having an ester bond in the main chain, and a polycarbonate urethane resin having a carbonate bond in the main chain. In particular, an anionic urethane resin microparticle may be used.

The content of the resin emulsion may be 0.1 to 5.0 mass %, 0.1 to 3.0 mass %, or 0.1 to 1.0 mass % as solid content with respect of the total mass of the ink composition. When the content of the resin emulsion is within the above range, the printing continuity tends to be further improved.

1.3.7. Surfactant

The ink composition of the present embodiment may contain a surfactant. The surfactant is not particularly limited, and examples thereof include an acetylene glycol-based surfactant, a fluorochemical surfactant, and a silicone-based surfactant.

The acetylene glycol-based surfactant is not particularly limited and may be one or more selected from alkylene oxide adducts of 2,4,7,9-tetramethyl-5-decine-4,7-diol and 2,4,7,9-tetramethyl-5-decine-4,7-diol and alkylene oxide adducts of 2,4-dimethyl-5-decin-4-ol and 2,4-dimethyl-5-decin-4-ol. Incidentally, the acetylene glycol-based surfactants may be used alone or in combination of two or more.

The fluorochemical surfactant is not particularly limited, and examples thereof include perfluoroalkyl sulfonates, perfluoroalkyl carboxylates, perfluoroalkyl phosphates, perfluoloalkyl ethylene oxide adducts, perfluoroalkylbetaines, and perfluoroalkylamine oxide compounds. Incidentally, the fluorochemical surfactants may be used alone or in combination of two or more.

Examples of the silicone-based surfactant include polysiloxane compounds and polyether-modified organosiloxane. Incidentally, the silicone-based surfactants may be used alone or in combination of two or more.

The content of the surfactant may be 0.1 to 5.0 mass %, 0.1 to 2.0 mass %, or 0.3 to 1.5 mass % with respect to the total mass of the ink composition. When the content of the surfactant is within the above range, the printing continuity tends to be further improved.

1.3.8. pH Adjuster

The pH adjuster is not particularly limited, and examples thereof include inorganic acids (e.g., sulfuric acid, hydrochloric acid, and nitric acid), inorganic bases (e.g., lithium hydroxide, sodium hydroxide, potassium hydroxide, and ammonia), organic bases (triethanolamine, diethanolamine, monoethanolamine, and tripropanolamine), and organic acids (e.g., adipic acid, citric acid, and succinic acid). In particular, an organic base may be used. The pH adjusters may be used alone or in combination of two or more.

The content of the pH adjuster may be 0.1 to 2.0 mass %, 0.1 to 1.5 mass %, or 0.1 to 1.0 mass % with respect to the total mass of the ink composition. When the content of the pH adjuster is within the above range, the precipitation is further suppressed, and the printing continuity tends to be further improved.

1.4. Recording Medium

The recording medium is not particularly limited, and examples thereof include an absorbent recording medium, a low-absorbent recording medium, and a non-absorbent recording medium. In particular, the absorbent recording medium or the low-absorbent recording medium may be used, and the absorbent recording medium may be used. The filling effect by inorganic oxide microparticles is exhibited more easily with an increase in the absorbency, the color development is consequently likely to be improved, and therefore the present disclosure is particularly useful.

Here, the term "low-absorbent recording medium" or "non-absorbent recording medium" refers to a recording medium having a water absorption amount of 10 mL/m$^2$ or less from the start of contact to 30 msec in a Bristow method. This Bristow method is a most popular method for measuring the amount of liquid absorption in a short time and is adopted also by Japan Technical Association of the Pulp and Paper Industry (JAPAN TAPPI). The details of the test method are described in the standard No. 51 "Paper and Paperboard—Liquid Absorbency Test Method—Bristow method" of the "JAPAN TAPPI Paper Pulp Test Method, 2000 Edition".

Incidentally, the low-absorbent recording medium refers to a recording medium having a water absorption amount of 5 mL/m$^2$ or more and 10 mL/m$^2$ or less. On the other hand, the absorbent recording medium refers to a recording medium having a water absorption amount exceeding 10 mL/m$^2$.

The absorbent recording medium is not particularly limited, and examples thereof include plain paper such as electrophotographic paper with high penetrability of an ink composition, ink jet paper (ink jet exclusive paper with an ink absorption layer made of silica particles or alumina particles or an ink absorption layer made of a hydrophilic polymer such as polyvinyl alcohol (PVA) or polyvinyl pyrrolidone (PVP)). Fabric is also mentioned.

The low-absorbent recording medium is not particularly limited, and examples thereof include coated paper having a coating layer for receiving oil-based ink on the surface. The coated paper is not particularly limited, and examples thereof include printing paper, such as art paper, coated paper, and matte paper.

The non-absorbent recording medium is not particularly limited, and examples thereof include films and plates of plastics such as polyvinyl chloride, polyethylene, polypropylene, polyethylene terephthalate (PET), polycarbonate, polystyrene, and polyurethane; plates of metals such as iron, silver, copper, and aluminum; metal plates produced by deposition of such various metals, plastic films, and plates of alloys such as stainless steel and brass; and recording media obtained by adhesion (coating) of films of plastics, such as polyvinyl chloride, polyethylene, polypropylene, polyethylene terephthalate (PET), polycarbonate, polystyrene, and polyurethane, to paper substrates.

2. Recording Apparatus

The recording apparatus of the present embodiment comprises an ink chamber and an ink jet head to which an ink composition is supplied from the ink chamber, wherein the ink chamber receives supply of the ink composition from an ink container and has a capacity of 40 mL or more, and the ink composition is an aqueous ink composition containing a pigment and an inorganic oxide particle having a specific gravity higher than that of the pigment.

Examples

The present disclosure will now be more specifically described using Examples and Comparative Examples. The present disclosure is not intended to be limited to the following Examples.

1. Preparation of Ink

The respective components were placed in a mixture tank such that each of the compositions shown in Tables 1 to 3 was obtained and were mixed and stirred and were further filtrated through a membrane filer of 5 μm to obtain the ink jet ink of each Example. Incidentally, the numerical value of each component shown in each Example in the tables represents mass % unless otherwise specified. In the tables, the numerical values regarding inorganic oxide particles, pigment dispersions, and resins represent the mass % of the solid contents.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Pigment dispersion (solid content) | Black pigment A (Average particle diameter 130 nm) | 6.0 | | | | | | | | | |
| | Black pigment B (Average particle diameter 180 nm) | | 6.0 | | | | | | | | |
| | Black pigment C (Average particle diameter 80 nm) | | | 6.0 | | | | | | | |
| | Black pigment D (Average particle diameter 250 nm) | | | | 6.0 | | | | | | |
| | Black pigment E (Average particle diameter 60 nm) | | | | | 6.0 | | | | | |
| | Cyan pigment | | | | | | 6.0 | 6.0 | 6.0 | | |
| | Magenta pigment | | | | | | | | | 6.0 | |
| | Yellow pigment | | | | | | | | | | 6.0 |
| | Titanium oxide | | | | | | | | | | |
| Inorganic oxide (solid content) | Silica (45 nm) | 3.0 | 3.0 | 3.0 | 3.0 | 3.0 | 3.0 | 3.0 | 3.0 | 3.0 | 3.0 |
| | Silica (25 nm) | | | | | | | | | | |
| | Silica (80 nm) | | | | | | | | | | |
| | Alumina | | | | | | | | | | |
| Water-soluble organic solvent | Glycerin | 5.0 | 5.0 | 5.0 | 5.0 | 5.0 | 5.0 | 5.0 | 5.0 | 5.0 | 5.0 |
| | Triethylene glycol | 5.0 | 5.0 | 5.0 | 5.0 | 5.0 | 5.0 | 5.0 | 5.0 | 5.0 | 5.0 |
| | Triethylene glycol monobutyl ether | 1.0 | 1.0 | 1.0 | 1.0 | 1.0 | 1.0 | 1.0 | 1.0 | 1.0 | 1.0 |
| | Triethylene glycol monomethyl ether | 2.0 | 2.0 | 2.0 | 2.0 | 2.0 | 2.0 | 2.0 | 2.0 | 2.0 | 2.0 |
| | 1,2-Hexanediol | 0.5 | 0.5 | 0.5 | 0.5 | 0.5 | 0.5 | 0.5 | 0.5 | 0.5 | 0.5 |
| Lactam compound | 1-(2-Hydroxyethyl)-2-pyrrolidone | 1.0 | 1.0 | 1.0 | 1.0 | 1.0 | 1.0 | 1.0 | 1.0 | 1.0 | 1.0 |
| | ε-Caprolactone | 3.0 | 3.0 | 3.0 | 3.0 | 3.0 | 3.0 | 3.0 | 3.0 | 3.0 | 3.0 |
| Resin (solid content) | X-436 | 0.3 | 0.3 | 0.3 | 0.3 | 0.3 | 0.3 | 0.3 | 0.3 | 0.3 | 0.3 |
| Surfactant | OLFINE E1010 | 0.5 | 0.5 | 0.5 | 0.5 | 0.5 | 0.5 | 0.5 | 0.5 | 0.5 | 0.5 |
| | Surfynol 104 | 0.3 | 0.3 | 0.3 | 0.3 | 0.3 | 0.3 | 0.3 | 0.3 | 0.3 | 0.3 |
| | OLFINE EXP4300 | 0.1 | 0.1 | 0.1 | 0.1 | 0.1 | 0.1 | 0.1 | 0.1 | 0.1 | 0.1 |
| pH Adjuster | Triethanolamine | 0.5 | 0.5 | 0.5 | 0.5 | 0.5 | 0.5 | 0.5 | 0.5 | 0.5 | 0.5 |
| | Water | Balance | Balance | Balance | Balance | Balance | Balance | Balance | Balance | Balance | Balance |
| Condition | Ink chamber (sub-tank/CISS) | Presence | Presence | Presence | Presence | Presence | Presence | Presence | Presence | Presence | Presence |
| | Ink chamber capacity [mL] | 70 | 70 | 70 | 70 | 70 | 70 | 70 | 70 | 70 | 70 |
| | Stirring mechanism, ink circulation mechanism | Absence | Absence | Absence | Absence | Absence | Absence | Absence | Presence | Presence | Absence |
| | Channel length from sub-tank to head discharge portion [mm] | 500 | 500 | 500 | 500 | 500 | 500 | 500 | 500 | 500 | 500 |
| | Presence or absence of silica | Presence | Presence | Presence | Presence | Presence | Presence | Presence | Presence | Presence | Presence |
| | Silica specific gravity/pigment specific gravity | 1< | 1< | 1< | 1< | 1< | 1< | 1< | 1< | 1< | 1< |
| | Pigment particle diameter (D50) [nm] | 130 | 180 | 80 | 250 | 60 | 130 | 130 | 130 | 180 | 130 |
| | Inorganic oxide particle diameter (D50) [nm] | 45 | 45 | 45 | 45 | 45 | 45 | 45 | 45 | 45 | 45 |
| Evaluation | Precipitation property | B | B | A | C | A | C | B | A | A | B |
| | Color development | B | A | B | A | C | B | B | B | A | B |
| | Printing continuity | B | B | B | B | B | A | A | B | B | B |

TABLE 2

| | | Example | | | | | | | | | |
|---|---|---|---|---|---|---|---|---|---|---|---|
| | | 11 | 12 | 13 | 14 | 15 | 16 | 17 | 18 | 19 | 30 |
| Pigment dispersion (solid content) | Black pigment A (Average particle diameter 130 nm) | | | 6.0 | 9.0 | 3.0 | 6.0 | 6.0 | 6.0 | 6.0 | 6.0 |
| | Black pigment B (Average particle diameter 180 nm) | | | | | | | | | | |
| | Black pigment C (Average particle diameter 80 nm) | | | | | | | | | | |
| | Black pigment D (Average particle diameter 250 nm) | | | | | | | | | | |
| | Black pigment E (Average particle diameter 60 nm) | | | | | | | | | | |
| | Cyan pigment | 6.0 | | | | | | | | | |
| | Magenta pigment | | 6.0 | | | | | | | | |
| | Yellow pigment | | | | | | | | | | |
| | Titanium oxide | | | | | | | | | | |
| Inorganic oxide (solid content) | Silica (45 nm) | 3.0 | 3.0 | | | | | | | | |
| | Silica (25 nm) | | | | 3.0 | 3.0 | | | 3.0 | | 3.0 |
| | Silica (80 nm) | | | | | | | | | 3.0 | |
| | Alumina | | | 3.0 | | | 5.0 | 1.0 | | | |
| Water-soluble organic solvent | Glycerin | 5.0 | 5.0 | 5.0 | 5.0 | 5.0 | 5.0 | 5.0 | 5.0 | 5.0 | 10.0 |
| | Triethylene glycol | 5.0 | 5.0 | 5.0 | 5.0 | 5.0 | 5.0 | 5.0 | 5.0 | 5.0 | 10.0 |
| | Triethylene glycol monobutyl ether | 1.0 | 1.0 | 1.0 | 1.0 | 1.0 | 1.0 | 1.0 | 1.0 | 1.0 | 1.0 |
| | Triethylene glycol monomethyl ether | 2.0 | 2.0 | 2.0 | 2.0 | 2.0 | 2.0 | 2.0 | 2.0 | 2.0 | 2.0 |
| | 1,2-Hexanediol | 0.5 | 0.5 | 0.5 | 0.5 | 0.5 | 0.5 | 0.5 | 0.5 | 0.5 | 0.5 |
| Lactam compound | 1-(2-Hydroxyethyl)-2-pyrrolidone | 1.0 | 1.0 | 1.0 | 1.0 | 1.0 | 1.0 | 1.0 | 1.0 | 1.0 | 1.0 |
| | ε-Caprolactone | 3.0 | 3.0 | 3.0 | 3.0 | 3.0 | 3.0 | 3.0 | 3.0 | 3.0 | 3.0 |
| Resin (solid content) | X-436 | 0.3 | 0.3 | 0.3 | 0.3 | 0.3 | 0.3 | 0.3 | 0.3 | 0.3 | 0.3 |
| Surfactant | OLFINE E1010 | 0.5 | 0.5 | 0.5 | 0.5 | 0.5 | 0.5 | 0.5 | 0.5 | 0.5 | 0.5 |
| | Surfynol 104 | 0.3 | 0.3 | 0.3 | 0.3 | 0.3 | 0.3 | 0.3 | 0.3 | 0.3 | 0.3 |
| | OLFINE EXP4300 | 0.1 | 0.1 | 0.1 | 0.1 | 0.1 | 0.1 | 0.1 | 0.1 | 0.1 | 0.1 |
| pH Adjuster | Triethanolamine | 0.5 | 0.5 | 0.5 | 0.5 | 0.5 | 0.5 | 0.5 | 0.5 | 0.5 | 0.5 |
| | Water | Balance | Balance | Balance | Balance | Balance | Balance | Balance | Balance | Balance | Balance |
| Condition | Ink chamber (sub-tank/CISS) | Presence | Presence | Presence | Presence | Presence | Presence | Presence | Presence | Presence | Presence |
| | Ink chamber capacity [mL] | 70 | 70 | 70 | 70 | 70 | 70 | 70 | 70 | 70 | 70 |
| | Stirring mechanism, ink circulation mechanism | Absence | Absence | Absence | Absence | Absence | Absence | Absence | Absence | Absence | Absence |
| | Channel length from sub-tank to head discharge portion [mm] | 500 | 500 | 500 | 500 | 500 | 500 | 500 | 500 | 500 | 500 |
| | Presence or absence of silica | Presence | Presence | Presence | Presence | Presence | Presence | Presence | Presence | Presence | Presence |
| | Silica specific gravity/pigment specific gravity | 1< | 1< | 1< | 1< | 1< | 1< | 1< | 1< | 1< | 1< |
| | Pigment particle diameter (D50) [nm] | 130 | 130 | 130 | 130 | 130 | 130 | 130 | 130 | 130 | 130 |
| | Inorganic oxide particle diameter (D50) [nm] | 45 | 45 | 40 | 45 | 45 | 45 | 45 | 25 | 80 | 45 |
| Evaluation | Precipitation property | B | B | C | A | C | A | C | A | C | A |
| | Color development | B | B | B | A | C | A | C | C | A | B |
| | Printing continuity | B | B | B | B | B | B | B | B | B | B |

TABLE 3

| | | Example | | | Comparative Example | | | | | |
|---|---|---|---|---|---|---|---|---|---|---|
| | | 21 | 22 | 23 | 1 | 2 | 3 | 4 | 5 | 6 |
| Pigment dispersion (solid content) | Black pigment A (Average particle diameter 130 nm) | 6.0 | 6.0 | 6.0 | | 6.0 | | 6.0 | 6.0 | |
| | Black pigment B (Average particle diameter 180 nm) | | | | | | | | | |
| | Black pigment C (Average particle diameter 80 nm) | | | | | | | | | |
| | Black pigment D (Average particle diameter 250 nm) | | | | | | | | | 6.0 |
| | Black pigment E (Average particle diameter 60 nm) | | | | | | 6.0 | | | |
| | Cyan pigment | | | | | | | | | |
| | Magenta pigment | | | | | | | | | |
| | Yellow pigment | | | | | | | | | |
| | Titanium oxide | | | | 6.0 | | | | | |
| Inorganic oxide (solid content) | Silica (45 nm) | 3.0 | 3.0 | 3.0 | 3.0 | | | 3.0 | 3.0 | |
| | Silica (25 nm) | | | | | | | | | |
| | Silica (80 nm) | | | | | | | | | |
| | Alumina | | | | | | | | | |
| Water-soluble organic solvent | Glycerin | 1.0 | 5.0 | 5.0 | 5.0 | 5.0 | 5.0 | 5.0 | 5.0 | 5.0 |
| | Triethylene glycol | 1.0 | 5.0 | 5.0 | 5.0 | 5.0 | 5.0 | 5.0 | 5.0 | 5.0 |
| | Triethylene glycol monobutyl ether | 1.0 | 1.0 | 1.0 | 1.0 | 1.0 | 1.0 | 1.0 | 1.0 | 1.0 |
| | Triethylene glycol monomethyl ether | 2.0 | 2.0 | 2.0 | 2.0 | 2.0 | 2.0 | 2.0 | 2.0 | 2.0 |
| | 1,2-Hexanediol | 0.5 | 0.5 | 0.5 | 0.5 | 0.5 | 0.5 | 0.5 | 0.5 | 0.5 |
| Lactam compound | 1-(2-Hydroxyethyl)-2-pyrrolidone | 1.0 | 1.0 | 1.0 | 1.0 | 1.0 | 1.0 | 1.0 | 1.0 | 1.0 |
| | ε-Caprolactone | 3.0 | 3.0 | 3.0 | 3.0 | 3.0 | 3.0 | 3.0 | 3.0 | 3.0 |
| Resin (solid content) | X-436 | 0.3 | 0.3 | 0.3 | 0.3 | 0.3 | 0.3 | 0.3 | 0.3 | 0.3 |
| Surfactant | OLFINE E1010 | 0.5 | 0.5 | 0.5 | 0.5 | 0.5 | 0.5 | 0.5 | 0.5 | 0.5 |
| | Surfynol 104 | 0.3 | 0.3 | 0.3 | 0.3 | 0.3 | 0.3 | 0.3 | 0.3 | 0.3 |
| | OLFINE EXP4300 | 0.1 | 0.1 | 0.1 | 0.1 | 0.1 | 0.1 | 0.1 | 0.1 | 0.1 |
| pH Adjuster | Triethanolamine | 0.5 | 0.5 | 0.5 | 0.5 | 0.5 | 0.5 | 0.5 | 0.5 | 0.5 |
| Condition | Water | Balance | Balance | Balance | Balance | Balance | Balance | Balance | Balance | Balance |
| | Ink chamber (sub-tank/CISS) | Presence | Presence | Presence | Presence | Presence | Presence | Absence | Presence | Presence |
| | Ink chamber capacity [mL] | 70 | 70 | 70 | 70 | 70 | 70 | — | 30 | 70 |
| | Stirring mechanism, ink circulation mechanism | Absence | Absence | Absence | Absence | Absence | Absence | Absence | Absence | Absence |
| | Channel length from sub-tank to head discharge portion [mm] | 500 | 100 | 1200 | 500 | 500 | 500 | 500 | 500 | 500 |
| | Presence or absence of silica | Presence | Presence | Presence | Presence | Absence | Absence | Presence | Presence | Absence |
| | Silica specific gravity/pigment specific gravity | 1< | 1< | 1< | 1≥ | — | — | 1< | 1< | — |
| | Pigment particle diameter (D50) [nm] | 130 | 130 | 130 | 250 | 130 | 130 | 130 | 130 | 60 |
| | Inorganic oxide particle diameter (D50) [nm] | 45 | 45 | 45 | 45 | 45 | 45 | 45 | 45 | 45 |
| Evaluation | Precipitation property | C | C | A | D | D | D | A | A | B |
| | Color development | B | B | B | B | D | C | B | B | D |
| | Printing continuity | B | B | B | B | B | B | D | C | B |

The abbreviations and product components used in Tables 1 to 3 are as follows:

Pigment Dispersion
　Black pigment A (average particle diameter: 130 nm, carbon black)
　Black pigment B (average particle diameter: 180 nm, carbon black)
　Black pigment C (average particle diameter: 80 nm, carbon black)
　Black pigment D (average particle diameter: 250 nm, carbon black)
　Black pigment E (average particle diameter: 60 nm, carbon black)
　Cyan pigment (average particle diameter: 130 nm, Pigment Blue 15:3)
　Magenta pigment (average particle diameter: 130 nm, Pigment Violet 19)
　Yellow pigment (average particle diameter: 130 nm, Pigment Yellow 74)
　White pigment (titanium oxide, carbon black, average particle diameter: 250 nm, R-550 manufactured by ISHIHARA SANGYO KAISHA, LTD.)

Inorganic Oxide Particle
　Colloidal silica (average particle diameter: 45 nm, SI-45P, manufactured by JGC Catalysts and Chemicals Ltd.)
　Colloidal silica (average particle diameter: 25 nm, SI-50, manufactured by JGC Catalysts and Chemicals Ltd.)
　Colloidal silica (average particle diameter: 80 nm, SI-80P, manufactured by JGC Catalysts and Chemicals Ltd.)
　Alumina (average particle diameter: 40 nm, NANOBYK-3600, manufactured by BYK Additives & Instruments)

Water-Soluble Organic Solvent
　Glycerin
　Triethylene glycol
　Triethylene glycol monobutyl ether
　Triethylene glycol monomethyl ether
　1,2-Hexanediol Lactam Compound
　1-(2-Hydroxyethyl)-2-pyrrolidone
　ε-Caprolactam Resin Emulsion
　Styrene-acrylic resin emulsion (manufactured by Seiko PMC Corporation, X-436, Tg: 33° C., acid value: 33 mg KOH/g)

Surfactant
　OLFINE E1010 (trade name, manufactured by Air Products and Chemicals, Inc., acetylene glycol-based surfactant)
　Surfynol 104 (trade name, manufactured by Nissin Chemical Industry Co., Ltd., acetylene glycol-based surfactant)
　OLFINE EXP4300 (trade name, manufactured by Air Products and Chemicals, Inc., acetylene glycol-based surfactant)

pH Adjuster
Triethanolamine 1.1. Example of Preparing Pigment Dispersions of Black Pigments A to E Pigment mother particles of carbon black were mixed with water, and the pigment mother particles were stirred and pulverized with a bead mill. On this occasion, the average particle diameter of the resulting particles was adjusted to that mentioned above by controlling the stirring time. Subsequently, the particles after pulverization were surface-treated to introduce a hydrophilic group to the particle surface. Thus, pigment dispersions of self-dispersion type black pigments A to E were obtained.

The surface treatment was performed as follows.

A pigment (20.0 g), ((4-aminobenzoylamino)-methane-1,1-diyl)bisphosphonic acid monosodium salt (11.0 mmol), nitric acid (20.0 mmol), and pure water (200 mL) were mixed. As the pigment, carbon black (trade name: "BLACK PEARLS 880", manufactured by Cabot Corporation) was used. The mixing was performed using a Silverson mixer at 6,000 rpm at room temperature. After 30 minutes, to this mixture were slowly added 20.0 mmol of sodium nitrite dissolved in a small amount of water. The addition of sodium nitrite raised the temperature of the mixture to 60° C. In this condition, the reaction was performed for 1 hour, followed by washing with water. Subsequently, the pH of the mixture was adjusted to 10 using a sodium hydroxide aqueous solution. The obtained pigment was a self-dispersing pigment having a —$C_6H_4$—CONH—CH—(PO(OH) (ONa)) (PO(OH)$_2$) group bonded to the surface of the pigment particle.

1.2. Example of Preparing Pigment Dispersion of Color Pigment

The pigment mother particles of the above-mentioned cyan pigment were mixed with water, and the pigment mother particles were stirred and pulverized with a bead mill. On this occasion, the average particle diameter of the resulting particles was adjusted to that mentioned above by controlling the stirring time.

This pigment (20.0 g), ((4-aminobenzoylamino)-methane-1,1-diyl)bisphosphonic acid monosodium salt (3.5 mmol), nitric acid (10.0 mmol), and pure water (200 mL) were mixed. The mixing was performed using a Silverson mixer at 6,000 rpm at room temperature. After 30 minutes, to this mixture were slowly added 10.0 mmol of sodium nitrite dissolved in a small amount of water. The addition of sodium nitrite raised the temperature of the mixture to 60° C. In this condition, the reaction was performed for 1 hour, followed by washing with water. Subsequently, the pH of the mixture was adjusted to 10 using a sodium hydroxide aqueous solution. A self-dispersing pigment having a —$C_6H_4$—CONH—CH—(PO(OH) (ONa)) (PO(OH)$_2$) group bonded to the surface of the pigment particle was obtained.

Thus, a pigment dispersion of a self-dispersion type cyan pigment was obtained.

Pigment dispersions of magenta pigment and yellow pigment were also obtained similarly by changing the pigment.

1.3. Example of Preparing Pigment Dispersion of White Pigment

The above-mentioned titanium oxide particles were used as the pigment mother particles, and the particles and a dispersant (DISPERBYK-190, manufactured by BYK Additives & Instruments) were mixed with water at a mass ratio, pigment:dispersant, of 3:1, and stirred to prepare a pigment dispersion.

Incidentally, carbon black had a specific gravity of 1.9, the color pigments had a specific gravity of 1.4 to 1.6, titanium oxide had a specific gravity of 4.2, silica had a specific gravity of 2.2, and alumina had a specific gravity of 4.0.

2. Evaluation

LX-10000F (manufactured by Seiko Epson Corporation) was modified to produce line printers including the sub-tanks of the respective capacities shown in Tables 1 to 3 and was loaded with inks shown in Tables 1 to 3 in a state of being capable of being discharged. Incidentally, it was configured such that the ink can be supplied to the sub-tank from an ink cartridge and that the ink can be supplied to an ink jet head from the sub-tank. As the ink jet head, a line head as shown in FIG. 2 was used. The nozzle density in the width direction was set to 600 npi. The length of the ink supply path channel from the sub-tank to a nozzle of the ink jet head was set to channel length in the tables. In examples not including a sub-tank, the distance from the ink cartridge to a nozzle of the ink jet head was used.

In the examples in which a stirring mechanism and an ink circulation mechanism were present, a screw was installed in the sub-tank. Furthermore, an ink return path was disposed between the ink jet head and the sub-tank to enable the ink to circulate between the ink jet head and the sub-tank. Thus, during leaving to stand in the precipitation test described later, the ink in the sub-tank was stirred with the screw, and the ink was circulated between the ink jet head and the sub-tank.

A solid pattern was then recorded on plain paper (Xerox P paper) under conditions of an ink deposition amount of 6 ng/dot and a recording dissolution of 600×600 dpi.

2.1. Precipitation Test

The sub-tank was left to stand for two weeks in the state of being loaded with an ink for the capacity. After the leaving to stand, a solid pattern was printed continuously under the above conditions until all the ink for the capacity of the sub-tank was used. The color of the solid pattern recorded before the leaving to stand and the color of the solid pattern for each sheet recorded during the continuous printing were measured, and the maximum color difference between the solid patterns was obtained. Based on the obtained color difference, the precipitation property was evaluated by the following evaluation criteria. In the example not having the sub-tank, printing was performed until the ink in the ink cartridge run out.

Incidentally, in the colorimetry, the L*a*b* values defined in CIELAB were measured using a colorimeter "Spectrolino" manufactured by GretagMacbeth LLC, and the difference (ΔE) between the values was determined as the color difference.

Evaluation Criteria
   A: a maximum color difference of less than 1.0 between each solid pattern;
   B: a maximum color difference of 1.0 or more and less than 2.0 between each solid pattern;
   C: a maximum color difference of 2.0 or more and less than 2.5 between each solid pattern; and
   D: a maximum color difference of 2.5 or more between each solid pattern.

2.2. Color Development

The OD value of a solid pattern printed before leaving to stand was measured with a reflection densitometer (trade name: Spectrolino, manufactured by GretagMacbeth LLC). Based on the obtained OD values, the color development was evaluated by the following evaluation criteria.

Evaluation Criteria
   A: an OD value of 1.33 or more;
   B: an OD value of 1.25 or more and less than 1.33;
   C: an OD value of 1.20 or more and less than 1.25; and
   D: an OD value of less than 1.20.

2.3. Printing Continuity

The sub-tank was loaded with an ink for the capacity, and how much printing was possible with the ink in the sub-tank was evaluated by setting such that no ink was supplied to the sub-tank from an ink cartridge. Incidentally, in the evaluation, a monochromic pattern defined in ISO/IEC19752 was printed. The number of sheets that could be printed before the ink in the sub-tank run out was counted, and the printing continuity was evaluated by the following evaluation criteria. In the example not having the sub-tank, since printing could not be performed without using an ink cartridge, it was judged that printing was impossible.

Evaluation Criteria
   A: capable of printing 10000 or more sheets;
   B: capable of printing 6000 or more and less than 10000 sheets;
   C: capable of printing less than 6000 sheets; and
   D: not capable of printing.

3. Evaluation Result

It was also demonstrated by comparison between Examples and Comparative Examples that even in a recording apparatus having a sub-tank, the precipitation of a pigment is suppressed and the color development is also improved by using an ink composition containing an inorganic oxide particle having a specific gravity higher than that of the pigment.

In Comparative Examples 1, 4, and 5, the inks did not contain an inorganic oxide particle or not contain an inorganic oxide particle having a specific gravity higher than that of the pigment and were inferior in suppression of pigment precipitation.

In Comparative Examples 4 and 5, the recording apparatuses did not include a sub-tank or not include a sub-tank having a capacity of 40 mL or more and were consequently excellent in suppression of pigment precipitation but inferior in printing continuity.

In Comparative Example 6, since the ink did not contain an inorganic oxide particle, the penetration of the ink to the recording medium could not be suppressed. In addition, a pigment having relatively low color development was used, and the color development was poor. Incidentally, when a pigment having relatively low color development was used, the pigment was unlikely to precipitate.

Incidentally, instead of the line printer including a sub-tank, separately, recording was performed using a printer including a CISS tank having the same capacity as that of the sub-tank. In also the results, recording could be performed similar to the case of the sub-tank, and the results were also similar.

What is claimed is:

1. A recording method that is conducted using a recording apparatus, the recording method comprising:
   a supply step of supplying an ink composition from an ink container to an ink chamber through a second ink supply path;
   a supply step of supplying the ink composition from the ink chamber to an ink jet head through a first ink supply path; and
   an adhesion step of discharging the ink composition from the ink jet head and allowing the composition to adhere to a recording medium,
   wherein the recording apparatus includes the ink container, the first ink supply path, the second ink supply path, and the ink jet head,
   the ink container is an ink cartridge or an ink pack that is removable from the recording apparatus,
   the ink chamber has a capacity of 40 mL to 500 mL, and
   the ink composition is an aqueous ink composition containing a pigment and an inorganic oxide particle having a specific gravity higher than that of the pigment.

2. The recording method according to claim 1, wherein the pigment has a volume average particle diameter of 20 to 250 nm.

3. The recording method according to claim 1, wherein a content of the inorganic oxide particle is 0.5 to 8.0 mass % with respect to the total mass of the ink composition.

4. The recording method according to claim 1, wherein the inorganic oxide particle has a volume average particle diameter of 100 nm or less.

5. The recording method according to claim 1, wherein
the ink composition contains a water-soluble organic solvent, and
a content of the water-soluble organic solvent is 5.0 to 25 mass % with respect to the total mass of the ink composition.

6. The recording method according to claim 1, wherein a length of an ink channel from the ink chamber to the ink jet head is 50 to 1500 mm.

7. The recording method according to claim 1, wherein the pigment includes either carbon black or an organic pigment.

8. The recording method according to claim 1, wherein the inorganic oxide particle includes one or more selected from the group consisting of silica, alumina, zirconia, titania, and ceria.

9. The recording method according to claim 1, wherein the ink composition contains a lactam compound.

10. The recording method according to claim 1, wherein a content of the pigment is 1.0 to 10 mass % with respect to the total mass of the ink composition.

11. The recording method according to claim 1, wherein in the adhesion step, recording is performed by a line system recording method using the ink jet head having a width equal to or larger than the width of the recording medium.

12. The recording method according to claim 1, wherein the recording medium is an absorbent recording medium.

13. A recording apparatus configured to conduct the recording method of claim 1, the recording apparatus comprising the ink composition, the ink chamber, the ink container, the first ink supply path, the second ink supply path, and the ink jet head.

14. The recording method according to claim 1, wherein the ink chamber is a sub-tank and the ink container is a main tank.

15. The recording method according to claim 1, wherein a volume of the ink composition in the ink container is 100 mL to 3000 mL.

* * * * *